United States Patent [19]
Cline et al.

[11] 3,863,541

[45] Feb. 4, 1975

[54] BERYLLIUM BORIDE ARMOR

[75] Inventors: Carl F. Cline, Walnut Creek; Mark L. Wilkins, Pleasanton, both of Calif.

[73] Assignee: The United States of America as represented by the Secretary of the Army, Washington, D.C.

[22] Filed: Feb. 7, 1972

[21] Appl. No.: 224,239

[52] U.S. Cl. ............................... 89/36 A, 161/404
[51] Int. Cl. ............................................. F41h 5/00
[58] Field of Search ............ 29/182.2; 106/39, 404; 161/213; 102/52; 89/36 A; 109/82

[56] References Cited
UNITED STATES PATENTS

| | | | |
|---|---|---|---|
| 2,372,607 | 3/1945 | Schwarzkopf | 89/36 A |
| 3,110,571 | 11/1963 | Alexander | 89/36 A |
| 3,179,553 | 4/1965 | Franklin | 89/36 A |
| 3,431,818 | 3/1969 | King | 89/36 A |
| 3,616,115 | 10/1971 | Klimmek | 89/36 A |
| 3,634,177 | 1/1972 | Glaser | 89/36 A |

*Primary Examiner*—Stephen J. Lechert, Jr.
*Attorney, Agent, or Firm*—Robert P. Gibson

[57] ABSTRACT

Hot-pressed beryllium boride material bonded to a backup material to provide a lightweight composite armor.

3 Claims, No Drawings

BERYLLIUM BORIDE ARMOR

This invention relates to an improved lightweight armor, and more particularly to hot-pressed $Be_2B$ and $Be_4B$ bonded to a backup material.

Conventional composite armor consists of a ceramic facing bonded to a supporting backing. The hard ceramic blunts and shatters the projectile on impact while the backing supports the ceramic against the resulting stresses. Theoretical analysis reveals that desirable properties of a ceramic include, e.g., low density, high sound speed, high elastic modulus and high strength. An example of a conventional composite armor possessing all of the above-mentioned attributes is boron carbide ($B_4C$) which comprises a boron carbide ceramic facing bonded to, e.g., a glass-reinforced plastic backing.

It has been found that the crystal structure of the ceramic has a significant effect on the ballistic performance of the armor. Specifically, the ceramic must be able to deform isotropically under the impact of the projectile. This requires that the crystal lattice of the ceramic be completely symmetrical. $Be_2B$ is one of the few known borides having a cubic lattice in addition to other desirable properties such as, low density, high sound speed, high elastic modulus and high strength. Boron carbide has a rhombohedral lattice and hence does not deform isotropically. Ballistic tests have shown that hot-pressed di beryllium boride ($Be_2B$) bonded to an aluminum backing is 10% more effective, on an equal weight basis, than conventional $B_4C$ composite armor.

Another aspect of the invention is the discovery that hot-pressed tetraberyllium boride ($Be_4B$) bonded to a fiberglass backing provides a composite armor which is 15% more effective than conventional $B_4C$/ fiberglass armor.

A further aspect of the invention is the discovery that the presence of BeO in the ceramic improves its ballistic properties.

It is an object of this invention to provide and disclose an improved light weight composite armor.

It is a further object of this invention to provide and disclose an improved light weight composite ceramic armor bonded to a supporting backing.

It is a further object of this invention to provide and disclose $Be_2B$ ceramic bonded to a supporting ceramic.

It is a further object of this invention to provide and disclose $Be_4B$ ceramic bonded to a supporting backing.

Other objects and a fuller understanding of the invention may be ascertained from the following description and claims.

Two processes are avaialable for the fabrication of the berylliumboride cermet. One method is "reaction hot pressing." The other method is "hot pressing." The distinction between these processes is that in reaction hot pressing, the starting material comprises the appropriate mixture of finely divided boron and beryllium powder which reacts to form the $Be_2B$ and $Be_4B$ in the mold. The conventional hot pressing operation requires preparation of the $Be_2B$ and $Be_4B$ powders prior to the consolidation thereof in the mold under hot pressing conditions.

The starting materials for reaction hot pressing in the preparation of $Be_2B$ and $Be_4B$ were amorphous boron powder and beryllium powder. The boron powder had a particle size of less than 5 microns which was contaminated with about 4% by weight of oxygen. The oxygen contaminant was not removed, since in the reaction hot pressing operation it results in the formation of BeO, whose presence in the final product improves its ballistic properties. The beryllium powder had a particle size in the range of about 1 to 60 microns. The micro structure of the final material is determined by the particle size of the beryllium powder. Further improvement in ballistic performance can be obtained by ball milling the beryllium powder to a particle size less that 5 microns in diameter.

A mixture of the beryllium and boron powders were blended in the appropriate weight ratio to fabricate $Be_2B$ and $Be_4B$, respectively, and transferred to a suitable mold 3 inches in diameter in 167 gram lots. The powder was compressed at 4,500 p.s.i., for a period of 6 minutes at a temperature of 1,080° C for $Be_2B$ and 1,050° C for the $Be_4B$ mixture. A cermet having a thickness of about 0.32 inch was obtained.

Samples of $Be_2B$ and $Be_4B$ cermets were prepared utilizing commercially available powders e.g., Cerax, having a particle size of less than −400 mesh. To make $Be_2B$ and $Be_4B$ ceramics disks 3 inches in diameter, the powder was loaded into an appropriate die and hot pressed for one-half hour at about 1,050° C and 5,000 − 5,400 psi.

Exemplary armor samples for ballistic testing were made by bonding the 0.32 inch thick ceramic disks to an aluminum plate 0.25 inch thick with a commercial adhesive, e.g., Scotchcast 281.

It has been discovered that a small amount of BeO impurities in the $Be_2B$ and $Be_4B$ cermet enhanced the ballistic performance for reasons which are not presently known. It has also been found that the grain size of the constituents and minimal porosity of the cermet is directly related to the ballistic performance of the armor. The ballistic performance of the cermet is generally an inverse function of these parameters. Although we have described our invention with a certain degree of particularity, we wish it to be understood that we do not desire to be limited to the exact details of fabrication shown and described for obvious modifications will occur to a person skilled in the art.

Having described our invention, we claim:

1. An improved lightweight armor comprising a cermet selected from the group consisting of $Be_2B$ and $Be_4B$ bonded to a backup plate.

2. An improved lightweight armor in accordance with claim 1 wherein the cermet comprises a minor amount of BeO.

3. An improved lightweight armor in accordance with claim 1 wherein the backup plate is constructed of aluminum.

* * * * *